Apr. 17, 1923.
F. J. GOULD
1,452,113
STONE SURFACING MACHINE
Original Filed Oct. 3, 1919
2 Sheets-Sheet 1
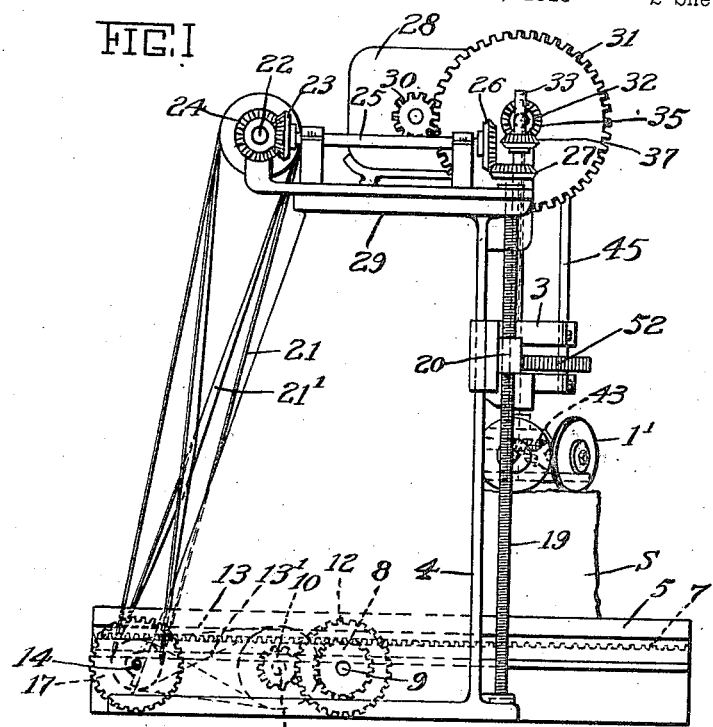
FIG. I
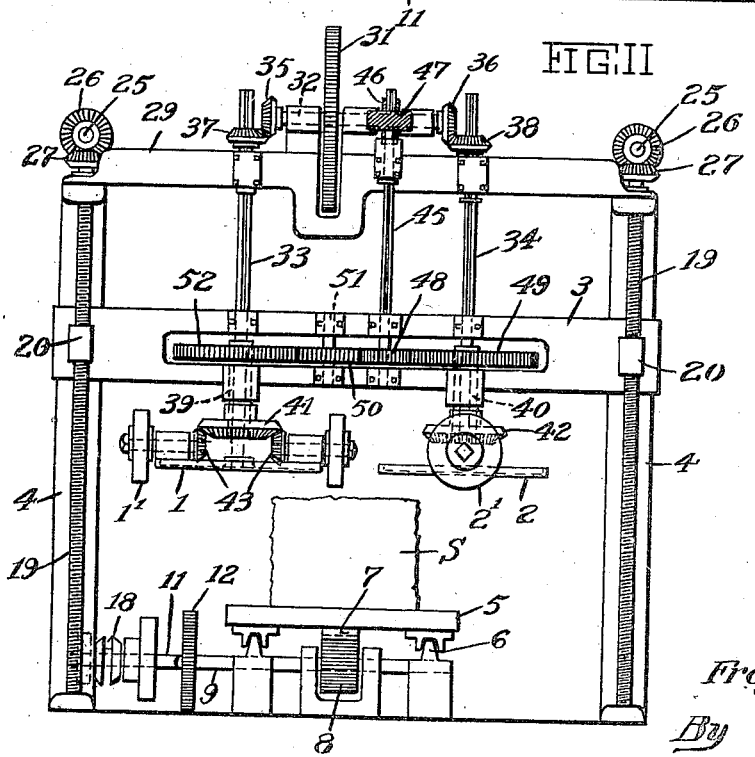
FIG. II
Inventor
Fred J. Gould
By
Attorney Apr. 17, 1923.
F. J. GOULD
1,452,113
STONE SURFACING MACHINE
Original Filed Oct. 3, 1919
2 Sheets-Sheet 2
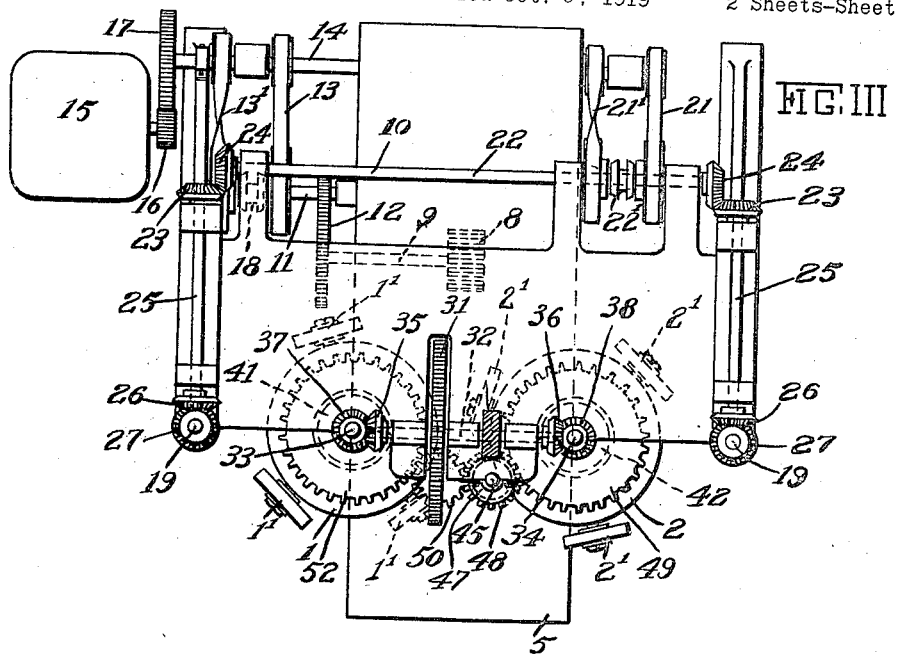
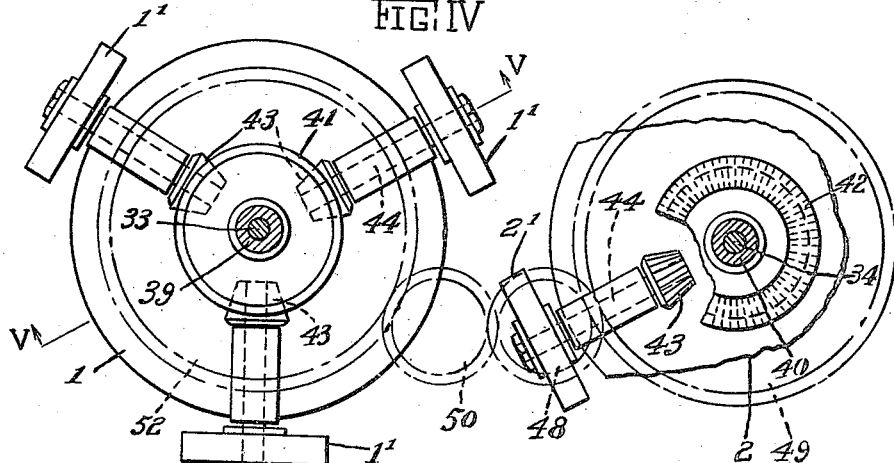
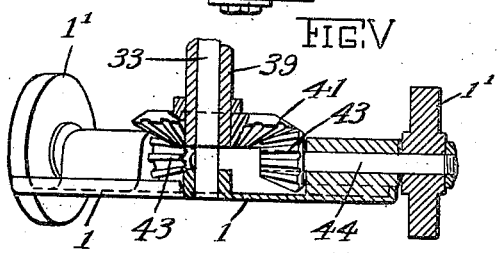
Inventor
Fred J. Gould
By Theo Sprague
Attorney Patented Apr. 17, 1923.

1,452,113

UNITED STATES PATENT OFFICE.

FRED J. GOULD, OF SPRINGFIELD, MASSACHUSETTS.

STONE-SURFACING MACHINE.

Application filed October 3, 1919, Serial No. 328,112. Renewed November 28, 1922.

*To all whom it may concern:*

Be it known that I, FRED J. GOULD, a citizen of the United States, residing at 10 Sumner Avenue, Springfield, Massachusetts, have invented certain new and useful Improvements in Stone-Surfacing Machines, of which the following is a specification.

This invention relates to stone surfacing machines and has for its general object to increase the efficiency of machines of this class, particularly as regards control of the cut, to the end that more and better work may be performed. This object, and certain other features of advantage which will appear more fully hereinafter, is secured in the machine of the present invention.

According to my invention, I provide duplicate cutter heads having their axes of rotation parallel to each other, and each equipped with a plurality or radially disposed revoluble cutters adapted to be driven independently of said heads over the surface of the stone to be polished as the stone is fed therebeneath, the cutters of one head coming in alternation with those of the opposite head whereby the paths cut by the respective groups of cutters slightly overlap to prevent leaving an unfinished "core" at the center. The cutter heads are mounted upon a common supporting member which is adjustable vertically relative to the stone to vary the depth of cut and the stone itself is mounted on a traveling table which feeds automatically beneath the cutters.

The construction and operation of my invention, together with an embodiment which well illustrates the principles involved is described and shown in the following specification and accompanying drawings, throughout which like reference characters are correspondingly employed, and in the drawings:

Fig. I is an end elevation of a surfacing machine in accordance with my invention.

Fig. II is a side view thereof.

Fig. III is a partial plan.

Fig. IV is a detail view of the complementary cutter heads, and

Fig. V is a partial section through one of said heads.

My novel cutter heads 1 and 2 are mounted for vertical adjustment upon the cross head 3 of a plurality of spaced uprights 4 constituting an open framing within which the stone S to be polished is supported upon a traveling table 5 located beneath the cutters. The table 5 is mounted on a suitable trackway 6 and is adapted to be fed longitudinally therealong by any suitable mechanism.

As here shown, the table 5 is provided with a rack 7 with which meshes a pinion 8 on a pinion shaft 9. Shaft 9 is driven from a clutch shaft 11 by means of a pinion 10 thereon meshing with a gear 12 on shaft 9. The clutch shaft 11 is provided with a reversing clutch 18 whereby the direction of feed of the table 5 may be reversed as it approaches the limit of its travel in either direction, and said shaft is adapted to be driven from a counter shaft 14 by either the open belt 13 or crossed belt $13^1$ according to the direction of feed of the table. The counter shaft 14 is driven from a motor 15 by a pinion 16 on the motor shaft which meshes with a gear 17 on the counter shaft.

The cross head 3 is adapted to be raised and lowered relative to the stone S by elevating screws 19 which are arranged to be driven in either direction at will to control the direction of movement of the head. The screws 19 engage through suitable nuts 20 on the cross head and are rotated in either direction by the motor 15. As here shown, the drive is from the counter shaft through either the open belt 21 or the crossed belt $21^1$ to a clutch shaft 22 which is provided with a reversing clutch $22^1$ for changing the direction of rotation of the screws. The clutch shaft 22 has bevel gears 24 thereon which mesh with gears 23 on stub shafts 25, and shafts 25 drive the screws through meshing gears 26 and 27 on stub shafts and screws, respectively.

The cutter heads 1 and 2 are mounted on shafts 33 and 34 and are adapted to be simultaneously driven in opposite directions by a motor 28 mounted on a cross girt 29. As here shown, the motor shaft has a pinion 30 thereon meshing with a gear 31 on a drive shaft 32. The shaft 32 drives shafts 33 and 34 through the bevel gears 35 and 36 which mesh with gears 37 and 38 on shafts 33 and 34. These shafts 33 and 34 are mounted in suitable bearings on the cross head 3 and girt 29 and pass freely through the bevel gears 37 and 38, which are splined thereto, as the cross head is raised and lowered by the elevating screws 19.

Each cutter head consists of a disc 1 or 2 upon which is mounted a plurality of radially disposed independently revoluble cutter elements $1^1$ and $2^1$ adapted to operate over the surface of the stone in alternation, one with the other so as to polish the entire surface.

To this end, the cutter shafts 33 and 34 are passed through hollow shafts or sleeves 39 and 40, which are rotated independently of said shafts, and are provided at their lower ends with bevel gears 41 and 42 which mesh with bevel pinions 43 on the inner ends of the arbors 44 for the cutters $1^1$ and $2^1$, there being a pinion 43 for each cutter element.

The sleeves 39 and 40 are rotated from the drive shaft 32 by a vertical shaft 45 journaled in bearings on the cross head 3 and girt 29 and provided with a spiral gear 46 meshing with a similar gear 47 on shaft 32, said gear 46 being splined to the shaft 45 to permit the shaft to slide upwardly therethrough when the cross head is elevated. At its lower end, shaft 45 is provided with a spur gear 48 which meshes with a spur gear 49 on sleeve 40 and through an interposed gear 50 on a stub shaft 51 meshing with a spur gear 52 on sleeve 39 drives said sleeve 39 in reverse direction to sleeve 40.

By this construction, the shafts 33 and 34 carrying discs 1 and 2 are simultaneously rotated direct from the drive shaft 32, and preferably in opposite directions, and the individual cutters $1^1$ and $2^1$ mounted on said discs are rotated independently of the rotation of said discs by shaft 45 and sleeves 39 and 40. This gives to the cutters $1^1$ and $2^1$ of each disc a circling motion as a group about the shafts 33 and 34 as axes and at the same time said cutters have independent revolution about their individual arbors 44, as indicated by the arrows, Fig. III. The arrangement is such that the cutters of one disc travel in alternating sequence to those of the other disc, producing a slight overlapping of the paths cut by the two groups of cutters whereby to prevent leaving an unfinished central "core" in the surface being polished. Preferably, the cutters of each disc group rotate in a direction opposite to the direction of rotation of the disc itself, and hence in directions opposite to each other.

In operation, with a block of stone S in place upon the traveling table 5, the cross head 3 is lowered until the abrasive elements $1^1$ and $2^1$ are cutting a suitable depth into the surface of the stone, which is automatically fed forward under said elements by the described stone feeding mechanism.

While I have shown and described the groups of cutters $1^1$ and $2^1$ as driven by the shaft 42 through the shaft 45, gears 48, 49, 50, 52, sleeves 39, and 40, bevel gears 41 and 42, and bevel pinions 43, said cutters may obviously be driven by any other mechanism which will cause them to rotate independently of the discs 1 and 2.

Various modifications in the construction and operation of my device may obviously be resorted to if within the limits of the appended claims.

What I therefore claim and desire to secure by Letters Patent is:

1. In a stone surfacing machine, a frame, a common drive shaft, a pair of shafts driven therefrom, rotary surfacing heads mounted on said shafts, rotary surfacing implements mounted on said heads, a pair of hollow shafts sleeved about said first-named pair of shafts, gearing between said hollow shafts and the arbors of said rotary surfacing implements for rotating said implements independently of the rotation of said heads, a shaft disposed between said pair of shafts and driven from said common drive shaft and gearing between said intermediate shaft and said hollow shafts.

2. In a stone surfacing machine, a frame, a common drive shaft, a pair of shafts driven therefrom, rotary surfacing heads mounted on said shafts, rotary surfacing implements mounted on said heads, a pair of hollow shafts sleeved about said first-named pair of shafts, gearing between said hollow shafts and the arbors of said rotary surfacing implements, for rotating said implements independently of the rotation of said heads, a shaft disposed between said pair of shafts and driven from said common drive shaft, a gear on said intermediate shaft, a gear on one of said hollow shafts meshing therewith, a stub shaft, a gear thereon meshing with said gear on the intermediate shaft, and a gear on the opposite hollow shaft meshing with the gear on said stub shaft whereby said hollow shafts are rotated in opposite directions to each other.

3. In a stone surfacing machine a common drive shaft, a pair of shafts driven therefrom, a rotary surfacing head mounted on each driven shaft, rotary surfacing implements mounted on said heads, and means for rotating said implements independently of the rotation of said heads including a shaft disposed between said pair of driven shafts and driven from said common drive shaft, and operative connections from said intermediate shaft to the arbors of said implements.

4. In a stone surfacing machine, a common drive shaft, a pair of shafts driven therefrom, a rotary surfacing head mounted on each driven shaft, rotary surfacing implements mounted on said heads, a pair of shafts for driving the arbors of said implements independently of the rotation of said surfacing heads, and a drive shaft for said last named pair of shafts driven from said common drive shaft.

In testimony whereof I affix my signature in presence of two witnesses.

FRED J. GOULD.

Witnesses:
JOHN H. PARKER,
ALBERT J. EPSTEIN.